July 2, 1963  G. W. BANKS  3,096,096

SEALING MEANS FOR SPINDLES OF FLUID VALVES

Filed Feb. 13, 1959  2 Sheets-Sheet 1

GEORGE W. BANKS
*INVENTOR.*

BY Smith & Tuck

July 2, 1963 G. W. BANKS 3,096,096
SEALING MEANS FOR SPINDLES OF FLUID VALVES
Filed Feb. 13, 1959 2 Sheets-Sheet 2

INVENTOR.
GEORGE W. BANKS
BY
Smith & Tuck

United States Patent Office 3,096,096
Patented July 2, 1963

3,096,096
SEALING MEANS FOR SPINDLES OF
FLUID VALVES
George W. Banks, 12424 14th Ave. S., Seattle 88, Wash.
Filed Feb. 13, 1959, Ser. No. 793,175
11 Claims. (Cl. 277—117)

This present invention relates to the general art of high pressure fluid controlling valves and more particularly to sealing means for the stems or spindles of high pressure valve assemblies.

The need for valves capable of safely controlling fluid pressures in the range up to 15,000 pounds p.s.i. and possibly higher has created a very difficult sealing problem, especially along the stems or spindles which are used to control the valve closure means proper and which spindle must be brought outside of the unit housing in order that a suitable manual control handle may be employed. This present invention is directed specifically to means for sealing the valve spindle in counterbalanced valves as the spindle passes through its retaining housings, in order to prevent the leakage of any fluid the valve is designed to handle.

The principal object of this present invention therefore is to provide a sealing means for high pressure fluid valves which will effectively prevent the leakage of such valves along their operating stems or spindles by an encircling sealing means to which pressure is uniformly applied by fluid means.

A further object of this present invention is to provide a valve stem sealing means which will seal the stem of the usual valve against leakage even though the stem is given either rotary or longitudinal movement or a combination of both.

A further object of this present invention is to employ a seal for valve stems that does not use lubrication in the sealing elements, thus making it suitable for oxygen service and the like.

A further object of this present invention is to provide sealing means which encircle the valve stem and in which the pressure of the fluid being controlled by the valve is employed to seat the sealing means to a degree in direct proportion to the need of seating pressure.

Further objects, advantages and capabilities will be apparent from the description and disclosure in the drawings or may be comprehended or are inherent in the device.

Figures 1, 3:
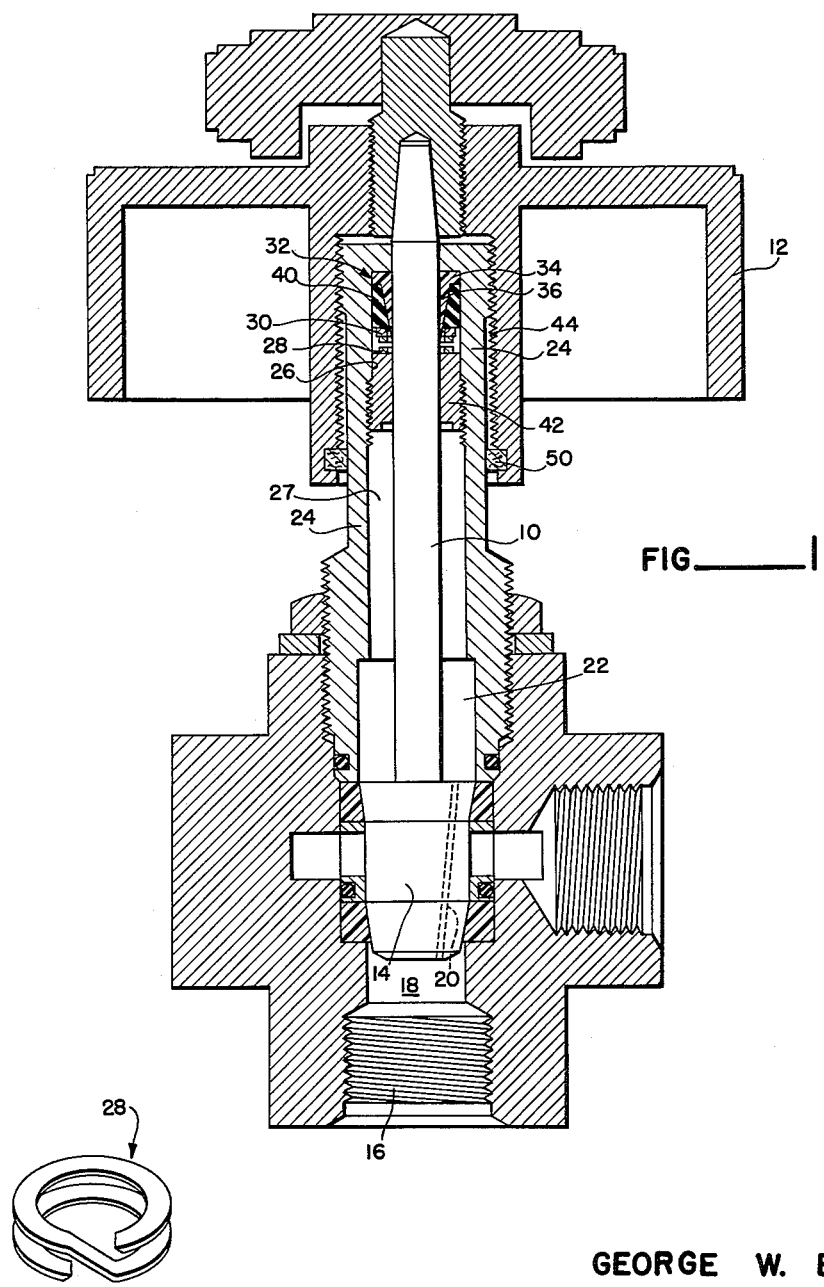
FIGURE 1 is a longitudinal sectional view, showing in a vertical position one type of fluid controlling valve to which this present sealing means is particularly well adapted.
FIGURE 3 is a perspective view of the temperature compensating spring used in the sealing means.

Referring to the drawings, throughout which like numerals indicate like parts, 10 designates the stem or spindle of a high pressure valve which at one end passes out externally through the spindle barrel 24 and is suitably secured to the operating handle 12. At its other end spindle 10 is operatively secured to a valve closure member 14. This particular type of closure has been selected due to the fact that it is normally operated by a combined rotary and longitudinal movement and this present sealing means functions equally well with a stem that revolves in operating, or has longitudinal movement, or which may combine the two. Valve closure member 14 is a type where the high pressure fluid admitted through piping secured to recess 16 enters the valve chamber 18 and then passes up through the fluid duct 20 and accumulates in the annular recess 22 until it has filled the recess and built up the same pressure present in valve chamber 18. It will be apparent, it is believed, that the fluid under pressure in chamber 22 will be free to pass upwardly along the spindle 10 to the sealing means as shown in FIGURES 1 and 2, and will pass out to the atmosphere unless the sealing means is adequate.

In order to prevent leakage along the valve stem or spindle 10 it has been found most convenient to employ a flowable mass under pressure to press a sealing element or sleeve snugly around the spindle with sufficient pressure to prevent leakage.

Figure 2:
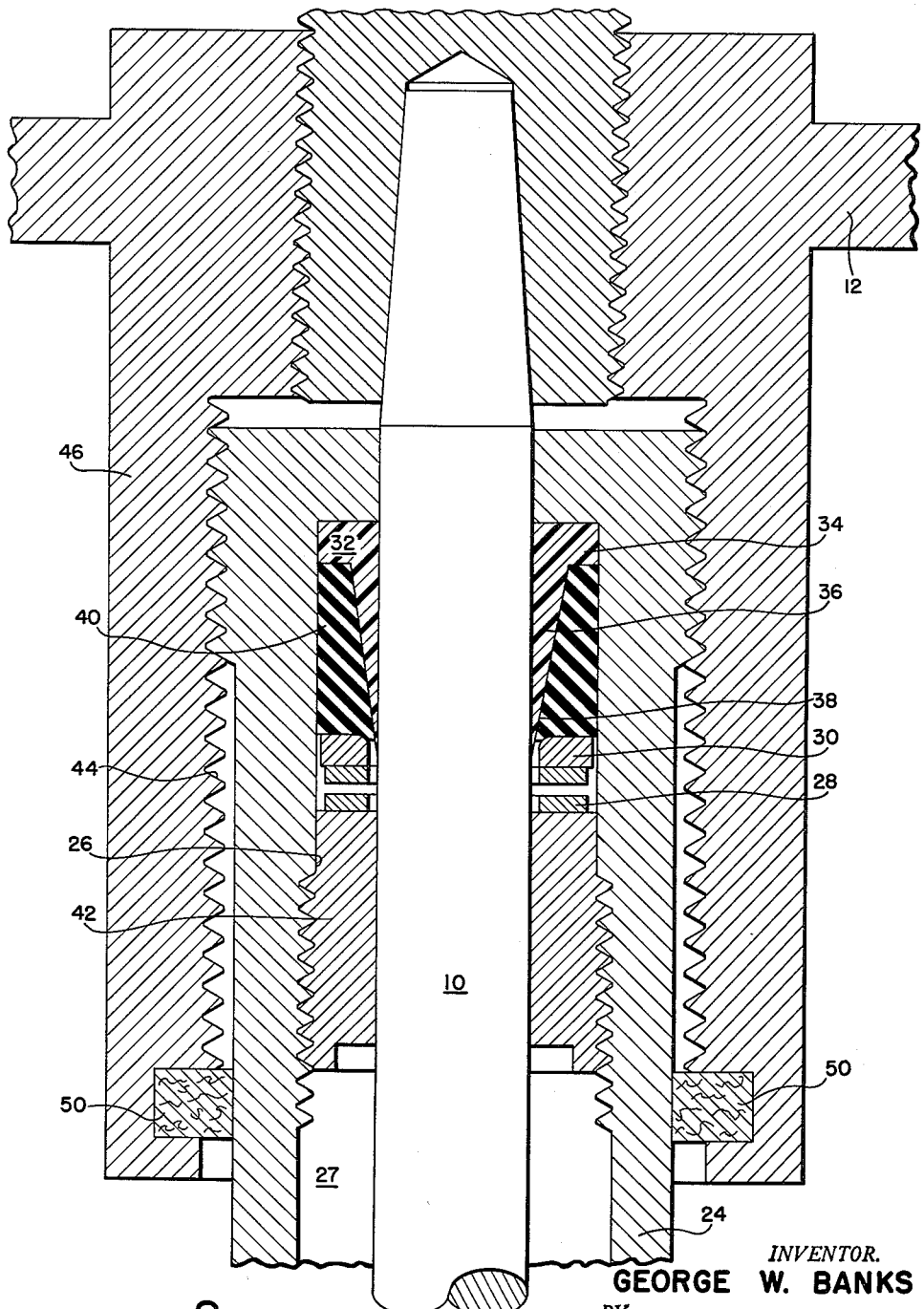
FIGURE 2 is an enlarged fragmentary longitudinal sectional view showing a portion of a valve spindle or stem of FIGURE 1 and showing the sealing means in enlarged sectional view.

Referring particularly to FIGURE 2, spindle 10 is surrounded and supported by a spindle barrel 24. This member has formed coaxially therewith the cylindrical recess at its upper or outer end as indicated at 26. This recess is a reduced diameter portion of the axial bore 27 and is closed at its bottom, as viewed, by a screwed in backing plug 42. At the bottom of recess 26 is first disposed the temperature compensating spring 28. This spring is so positioned that it places a predetermined compression upon the sealing elements and insures that they will always be in tight engagement ready to accept any pressure applied, whether it be a negative pressure or whether the pressures build up to the full pressure of the fluids being controlled. A relatively light spring 28 is employed and the general conformation is shown generally in FIGURE 2 and in the detailed FIGURE 3. A spring applying 12 pounds pressure is adequate for a 3/16" spindle.

A very important function of spring 28 is to provide a degree of resiliency so that despite temperature changes and expansion or contraction, substantially uniform pressure will be present on the sealing means at all times. A spring of this order is difficult to construct with a completely planar bearing surface; consequently it is preferred to employ a pressure application washer 30. This washer must be of sufficient substance to accept unequally applied spring pressure, and through its inherent stiffness to apply pressure to the sealing members that will be uniformly distributed over the whole pressure area of washer 30.

The preferred actual sealing means is made of one of the plastics of the type of tetrafluoroethylene and which is normally supplied to the market under the trade name of "Teflon." This material or any others that may be available that have certain characteristics will normally be suitable for this use. Quite important among these characteristics is that it will not seize on a metal spindle under pressure; but rather should inherently be of a composition that will freely slide on metal without lubrication. A further requirement is that while the material must have a high degree of rigidity, it must be capable of cold flowing under relatively high pressure. It is this last characteristic that makes it possible to apply pressure to the "Teflon" sealing or gland member and to distort it slightly but sufficiently so that a tight sealing contact may be made with a cylindrical sealing portion of spindle 10. In FIGURE 2 has been illustrated a satisfactory form for this plastic sealing member as is shown at 32. This exact form is not mandatory but appears to be the most satisfactory one presently determined for this purpose. The form shown in FIGURES 1 and 2 is an annular sleeve arrangement having a side wall portion 36 preferably in the form of a conical frustum and having the flange portion 34 disposed at its thickest wall portion. In order to be certain of sealing against very low pressures or negative pressures it is desirable to have the tapering portion 36 run out to a relatively fine edge as illustrated at 38 so that it can be pressed against the spindle with very little positive pressure or so the pressure spring 28 can effect the seal. As pressures build up it is desirable that these pressures will be backed up with an adequate thickness of wall, and therefore the form shown at 36 seems to meet these requirements better than any other shape currently devised. The exact shape, however, must be determined after the loading is determined and the characteristics of the plastics employed be known.

In order to apply external pressure to wall 36 a flowable medium 40 has been employed. This medium should fall under the dictionary definition of a fluid substance, namely: one which yields to any force tending to alter its shape without altering its volume. One material that has proven satisfactory for this use is silicon rubber, which is a dense material without voids or included air, and which has particles which move easily and change their relative position without a separation of the mass and will flow under even moderate pressure. Medium 40 as employed surrounds the tapering side wall portion 36 and engages the free face of flange 34. It is desirable to point out clearly that member 40, except at possibly very low pressures, does not act as a wedge in this case. For an annular wedge to function in this manner, the material of member 40 must be rigid if a true wedging action is to take place, particularly in view of the fact that the plastic material of member 32 is capable of limited local distortion, and therefore the application of pressure on the plastic material must be applied equally to all of the outer surface. In this present instance, however, the flange, as illustrated at 34, precludes any wedging action of real moment and calls for a fluid material that under pressure will have all the required characteristics of a hydraulic fluid.

It is desirable to point out that this sealing means requires but little diameter as will be noted in FIGURE 1. This makes it convenient to use an internal thread 44 inside of skirt 46 of handle 12 and to use threads of considerable strength and to have them well removed from the valve chambers as 18 and 22. This arrangement is indicated when the valve is designed to handle liquified gases which are very cold. Having the sealing means somewhat removed from the bulk of the cold liquids or gases, the operating handle can be manipulated without danger to the operator or without interference by the low temperature affecting the sealing means.

A felt or cork seal shown at 50 prevents dust or oil bearing air from entering the valve. The dust would accelerate wear and oil would make it very unsafe to use the valve when oxygen or similar types of gas are handled.

It is believed that it will be clearly apparent from the above description and the disclosure in the drawings that the invention comprehends a novel construction of sealing means for fluid valve stems.

Having thus disclosed the invention, I claim:

1. A sealing means for spindles of high pressure fluid valves, comprising: a valve spindle having a cylindrical sealing portion; a spindle barrel coaxially disposed around the sealing portion of said valve spindle and in which said spindle is guided and disposed for valve actuating movement; a coaxial recess in the outer end of said spindle barrel having a cylindrical portion and a threaded portion; a seal backing plug on said spindle barrel and threadedly engaging said threaded portion; a compression type compensating spring disposed around said valve spindle and seated on said plug; a plastic sealing member of conical frustum form, having an axial cylindrical bore, disposed in said recess and having a wall disposed around said valve spindle with its thinnest wall portion directed toward said spring; said sealing member made of a plastic material capable of limited cold flowing under pressure and having an annular flange at its thickest wall portion; a flowable medium having a cylindrical outer surface and a tapered axial bore adapted to fit the conical surface of said sealing member, disposed around the wall portion of said sealing member and substantially filling the space between the wall of said recess and said wall portion; a pressure application washer operatively disposed between said medium and said spring and coacting to position said fluid medium in intimate contact with said sealing member including the free face of said annular flange and said seal backing plug adapted to compress all the elements of the sealing means and position them in co-acting relationship.

2. A sealing means for spindles of high pressure fluid valves, comprising: a valve spindle having a sealing portion; a spindle barrel coaxially disposed around the sealing portion of said valve spindle; an axial bore in said spindle barrel having a coaxial recess, of reduced diameter, in the outer end of said spindle barrel adapted to receive spindle sealing means; a compression type compensating spring disposed around said valve spindle and seated in said recess; a plastic sealing member of conical frustum form having an axial cylindrical bore and a wall disposed around said valve spindle with its thinnest wall portion directed toward said spring; said sealing member made of a plastic material capable of limited cold flowing under pressure; and having an annular flange at its thickest wall portion disposed with its edge bearing on the inner wall of said recess; a flowable medium having a cylindrical outer surface and a tapered axial bore adapted to fit the conical surface of said sealing member, disposed around the wall portion of said sealing member and filling the space between the wall of said recess and said wall portion; a pressure application means operatively disposed between said flowable medium and the bottom of said recess and adapted to position said medium in intimate contact with said sealing member including the free face of said annular flange and adapted to apply pressure equally throughout the outer surface of said sealing member and a seal backing plug threadedly secured in said recess and adapted to compress the elements of the sealing means and position them in coacting relationship.

3. Sealing means for spindles, comprising: a cylindrical recess having an enclosing peripheral wall and an end wall with an axial bore therethrough for the passage of a movable spindle; a sealing sleeve having an outer surface of frustro-conical form and a cylindrical bore which extends until it intersects said outer surface and produces a fine edge on the pressure receiving end of said sleeve; said sleeve having a flange at its opposite end adapted to contact the inner surface of said enclosing wall throughout; a flowable pressure medium disposed in contact with said flange and said outer surface of said sealing sleeve and with the inner surface of said enclosing wall of said cylindrical recess; a pressure application washer disposed to engage the end of said pressure medium opposite from said flange and a resilient temperature compensating spring disposed to apply pressure to said washer.

4. The subject matter of claim 3 in which said sealing sleeve is made of a plastic material capable of limited cold flowing under high pressure.

5. The subject matter of claim 4 in which the material of which the sealing sleeve is made must have a high degree of rigidity and the ability to return to its initial shape after high pressure has been applied to it and then withdrawn.

6. The subject matter of claim 3 in which said flowable medium has the characteristic of yielding to any force tending to alter its shape without substantially altering its volume and is disposed to apply a force, imposed on it, equally over the area of the conical surface and flange of said sealing sleeve.

7. Sealing means for spindles of fluid valves, comprising: a sealing member made of a plastic capable of limited cold flowing under high pressures; said sealing member having an annular flange at one end and a fine edge at the other and an intermediate tapering side wall portion for encircling a valve spindle; means for fixedly positioning said annular flange; a flowable medium surrounding said tapering side wall and engaging the free face of said annular flange; means engaging said flowable medium at its end remote from said annular flange and having an annular opening adjacent the valve spindle to permit the flowable medium to engage the fine edge of said sealing member when fluid pressure is applied to said flowable medium.

8. The subject matter of claim 7 in which said annular opening is provided by a pressure application washer.

9. The combination according to claim 8 further provided with a relatively light, temperature compensating spring which biases said washer against said flowable medium during all temperature changes.

10. In a valve for controlling fluid under high pressure, a spindle, a spindle barrel surrounding said spindle to provide an annular chamber therebetween which is closed at the outer end thereof by a reduced diameter outer end on said spindle barrel, a conical sealing member encircling said spindle, said sealing member being made of a plastic capable of limited cold flowing under high pressure and having larger outer end positioned against the closed outer end of said annular chamber, said sealing member tapering inwardly from its larger end to a fine edge encircling said spindle at the inner end of said sealing member, a flowable medium surrounding the tapered portion of said sealing member and filling the space between said sealing member and said spindle barrel to prevent axial movement between said flowable medium and said sealing member, and pressure applying means engaging said flowable medium at its inner end, the area of engagement encircling said spindle and being spaced therefrom to provide an annular opening for said flowable medium to flow and engage the fine edge of said sealing member when fluid pressure is applied.

11. In a valve for controlling fluid under high pressure, a spindle, a spindle barrel surrounding said spindle to provide an annular chamber therebetween which is closed at the outer end thereof by a reduced diameter outer end on said spindle barrel, a conical sealing member encircling said spindle, said sealing member being made of a plastic capable of limited cold flowing under high pressure and having an annular flange at its outer end positioned against the closed outer end of said annular chamber, said sealing member tapering inwardly from the free face of said annular flange to a fine edge encircling said spindle at the inner end of said sealing member, a flowable medium surrounding the tapered portion of said sealing member and engaging the free face of said annular flange, and pressure-applying means engaging said flowable medium at its inner end, the area of engagement encircling said spindle and being spaced therefrom to provide an annular opening for said flowable medium to flow and engage the fine edge of said sealing member when fluid pressure is applied, and resilient means biasing said pressure-applying means against said flowable medium.

References Cited in the file of this patent
UNITED STATES PATENTS

| | | |
|---|---|---|
| 430,313 | Ensign et al. | June 17, 1890 |
| 851,147 | Willings | Apr. 23, 1907 |
| 854,239 | Rigby | May 21, 1907 |
| 1,320,567 | Nawn | Nov. 4, 1919 |
| 1,584,127 | Norton | May 11, 1926 |
| 1,597,254 | Vogel | Aug. 24, 1926 |
| 2,646,959 | Carver | July 28, 1953 |
| 2,745,687 | Stack | May 15, 1956 |
| 2,816,582 | Von Sneidern | Dec. 17, 1957 |
| 2,831,714 | Thorburn | Apr. 22, 1958 |